United States Patent
Zhao et al.

(10) Patent No.: US 12,499,351 B2
(45) Date of Patent: Dec. 16, 2025

(54) GRABBING DETECTION METHOD BASED ON RP-ResNet

(71) Applicant: Qingdao University of Technology, Qingdao (CN)

(72) Inventors: Jingbo Zhao, Qingdao (CN); Tengfei Qiu, Qingdao (CN); Jingxuhui Zhu, Qingdao (CN); Xinchao Liu, Qingdao (CN); Xiaohan Zhang, Qingdao (CN); Wenbin Zhang, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 461 days.

(21) Appl. No.: 17/762,275

(22) PCT Filed: Jun. 2, 2021

(86) PCT No.: PCT/CN2021/097882
§ 371 (c)(1),
(2) Date: Feb. 14, 2023

(87) PCT Pub. No.: WO2021/249255
PCT Pub. Date: Dec. 16, 2021

(65) Prior Publication Data
US 2023/0186056 A1    Jun. 15, 2023

(30) Foreign Application Priority Data
Jun. 12, 2020   (CN) .......................... 202010535619.8

(51) Int. Cl.
*G06N 3/0464* (2023.01)
*G06N 3/043* (2023.01)
(Continued)

(52) U.S. Cl.
CPC ............ *G06N 3/0464* (2023.01); *G06N 3/043* (2023.01); *G06N 3/048* (2023.01); *G06V 10/25* (2022.01);
(Continued)

(58) Field of Classification Search
CPC ...... G06N 3/0464; G06N 3/048; G06N 3/043; G06V 10/25; G06V 10/454; G06V 10/267
See application file for complete search history.

(56) References Cited

FOREIGN PATENT DOCUMENTS

CN          110009614 A   *   7/2019   ......... G01N 21/8851

* cited by examiner

*Primary Examiner* — Matthew C Bella
*Assistant Examiner* — Jinsu Hwang
(74) *Attorney, Agent, or Firm* — Morse, Barnes-Brown & Pendleton, P.C.; Martin Z. Zhang; James M. McKenzie

(57) ABSTRACT

The disclosure relates to a grabbing detection method based on an RP-ResNet. The method comprises: inputting an image of a target; pre-processing data; performing data processing by an RP-ResNet model; and finally, generating a grabbing block diagram of a target to be grabbed. On the basis of a model ResNet 50, a region proposal network is used in the 30th layer of a network, fuzzy positioning is performed on the positions of grabbing points, feature information of high and low layers is fully fused to strengthen the utilization of information of low layers, and the 40th layer of the network is added to an SENet structure, thereby further increasing the detection accuracy of a grabbing points. By a grabbing detection framework based on ResNet-50, a residual network, a region proposal idea and SENet are combined, thereby ensuring rapid and accurate target detection.

8 Claims, 3 Drawing Sheets

(51) Int. Cl.
*G06N 3/048* (2023.01)
*G06V 10/25* (2022.01)
*G06V 10/26* (2022.01)
*G06V 10/44* (2022.01)

(52) U.S. Cl.
CPC .......... *G06V 10/267* (2022.01); *G06V 10/454* (2022.01)

GRABBING DETECTION METHOD BASED ON RP-ResNet

CROSS REFERENCE TO RELATED APPLICATION

This patent application is a national stage application of International Patent Application No. PCT/CN2021/097882, filed on Jun. 2, 2021, which claims the benefit and priority of Chinese Patent Application No. 202010535619.8, titled "GRABBING DETECTION METHOD BASED ON RP-RESNET", filed on Jun. 12, 2020, the disclosures of which is are incorporated by reference herein in their entirety.

TECHNICAL FIELD

The present disclosure belongs to the field of computer vision, and specifically relates to recognition and positioning of grabbing points of a target.

BACKGROUND ART

Robot grabbing includes perception, planning and control. As a start, accurate and diversified detection of a robot's grabbing candidate for the target helps to better plan a grabbing path and improve the overall performance of a grabbing operation task.

With the development of a deep learning theory, many deep neural network models have emerged, and each network can be designed with layers of different weights to build network models of different depths. Although a deeper network may bring higher accuracy, it can reduce the speed of network training and detection. Since a residual structure does not increase model parameters, it can effectively ease the problems of vanishing gradient and training degradation in deep network training, thereby improving network convergence.

SUMMARY

The objective of the present disclosure is to provide a grabbing detection method based on a region proposal-residual network (RP-ResNet), which has the characteristic of fully fusing information of high and low layers of a deep neural network, and further significantly improves data processing speed and detection accuracy.

The present disclosure adopts a technical solution of processing and fusing data of a ResNet-50 in stages.

In a first stage, an input of a region proposal network (RPN) is a convolution feature map, and a convolution response image is segmented into regions of interest (ROI) according to a result of the RPN. The regions of interest in a part of channels (in each relative spatial position channel of each class) are divided into k×k grids, each grid is averagely pooled, and then all channels are averagely pooled. For an ROI with a size of w×h, the size of each region is W/h×W/h, a last convolution layer generates $k^2$ fraction maps for each class, and for an (i, j)th sub-region ($0 \leq i, j \leq k-1$) of the ROI:

$$r_C(i, j|\Theta) = \sum_{(x,y)} \frac{1}{n} z_{i,j,C}(x + x_0, y + y_0|\Theta) \quad (1)$$

where $r_c(i, j|\Theta)$ is a pooling response of an (i, j)th bin of a c class; $z_{i,j,c}$ is an output in $k^2(C+1)$ fraction maps; $(x_0, y_0)$ is a left top coordinate of the ROI; n is a total number of pixels in the bin; and $\Theta$ is a network parameter.

In a second stage, a squeeze-and-excitation network (SENet) module enhances attention of a key channel in a grabbing detection task to improve the detection accuracy:

$$z_c = F_{sq}(u_c) = \frac{1}{W \times H} \sum_{i=1}^{W} \sum_{j=1}^{H} u_c(i, j) \quad (2)$$

$$s = F_{ex}(z, W) = \sigma(W_2 \delta(W_1, z)) \quad (3)$$

$$\tilde{x}_c = F_{scale}(u_c, s_c) = s_c \cdot u_c \quad (4)$$

where $F_{sq}(u_c)$ represents compression of a feature map, W×H represents a size of a two-dimensional feature map, $F_{ex}()$ represents feature extraction of the feature map, Z represents a compressed feature vector transformed from the input two-dimensional feature map, $W_1$ and $W_2$ are weights of a full connection layer, $\sigma$ is a sigmoid activation function, and $\tilde{x}_c$ is a final output and is used as an input of a next stage.

According to specific embodiments provided by the present disclosure, the present disclosure has the following technical effects:

The present disclosure provides a grabbing detection method based on an RP-ResNet, which uses the characteristic that a deep neural network has weak semantic information and clear target positions in a low layer, and strong semantic information and fuzzy target positions in a high layer; the 30th layer of the ResNet is input into a regional proposal network (RPN), a network model is shown in FIG. 2, a k×k sliding window (3×3 in the RP-ResNet) is used to scan the entire feature map, and then a convolution kernel with a size of 1×1 is used to perform a convolution operation to obtain a fraction map of a 2 k (class) channel and a fraction map of a 4 k (bounding box) channel. In the experiment, a small window predicts a position of a window containing a target to make region proposal more accurate.

Furthermore, by a channel attention SENet structure, an adaptive calibration of the feature channel is completed by means of squeeze, excitation, and feature recalibration, interdependence between feature channels is established, features positive to the grabbing detection task are enhanced, and less useful features are suppressed, thereby improving the detection accuracy.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and persons of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely a part rather than all of the embodiments of the present disclosure. Based on the embodiments of the present disclosure, all other embodiments obtained by a person of ordinary skill in the art without creative efforts shall fall within the protection scope of the present disclosure.

The objective of the present disclosure is to provide a grabbing detection method based on a region proposal-residual network (RP-ResNet), which has the characteristic of fully fusing information of high and low layers of a deep neural network, and further significantly improves data processing speed and detection accuracy.

To make the above objectives, features, and advantages of the present disclosure clearer and more comprehensible, the present disclosure will be further described in detail below with reference to the accompanying drawings and the specific implementations.

Figure 1:
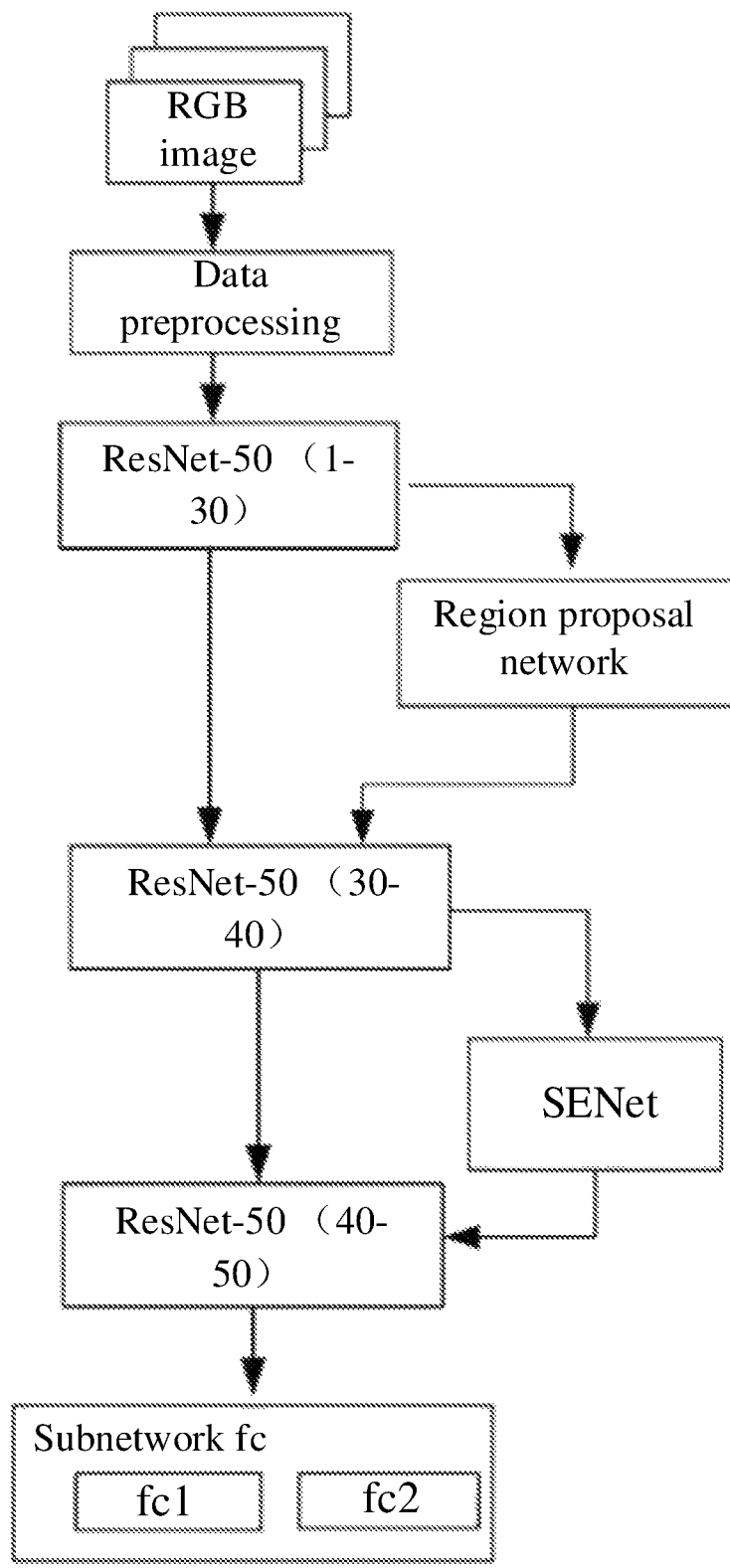
FIG. 1 is a basic schematic diagram of an RP-ResNet according to an embodiment of the present disclosure.

A basic schematic diagram of the grabbing detection method based on an RP-ResNet of the present embodiment is shown in FIG. 1, and the method specifically includes:
1, first, acquiring depth information and color image information of a target by a Kinect depth camera; and
2, adjusting a size of pixels of the acquired image of the target to 277*277 as an input of a network model, and inputting the processed image into a PR-ResNet to extract image features.

The 30th layer of the ResNet is input into a regional proposal network (RPN), a binary label is assigned to each generated box as proposed by Ren S Q et al., and whether a box is a target is determined using the label. One of the following two situations has a positive mark:
1) A specific frame or a frame having the highest intersection and union ratio with an actual frame.
2) A target frame has an intersection and union exceeding 70% of the actual frame. A true frame mark with the combination ratio less than 0.3 is a negative label. A multi-task loss function is used to minimize an objective function. The objective function is organized as follows:

$$L(\{p_i\}, \{t_i\}) = \frac{1}{N_{cls}}\sum_i L_{cls}(p_i, p_i^*) + \lambda \frac{1}{N_{reg}}\sum_i L_{reg}(t_i, t_i^*) \quad (1)$$

where i represents an index of a small batch of samples, $p_i$ represents a target probability of the index i of the small batch of samples; when a true label $p^*_i$ is 0, it means a negative label; $t_i$ represents a parameter change of a prediction boundary; $t^*_i$ represents a coordinate vector of a true frame corresponding to the index i of a small batch of positive-labelled samples; $L_{cls}$ and $L_{reg}$ respectively represent loss and regression loss, $N_{cls}$ and $N_{reg}$ represent normalization parameters; and λ represents a balance weight.

Figure 2:
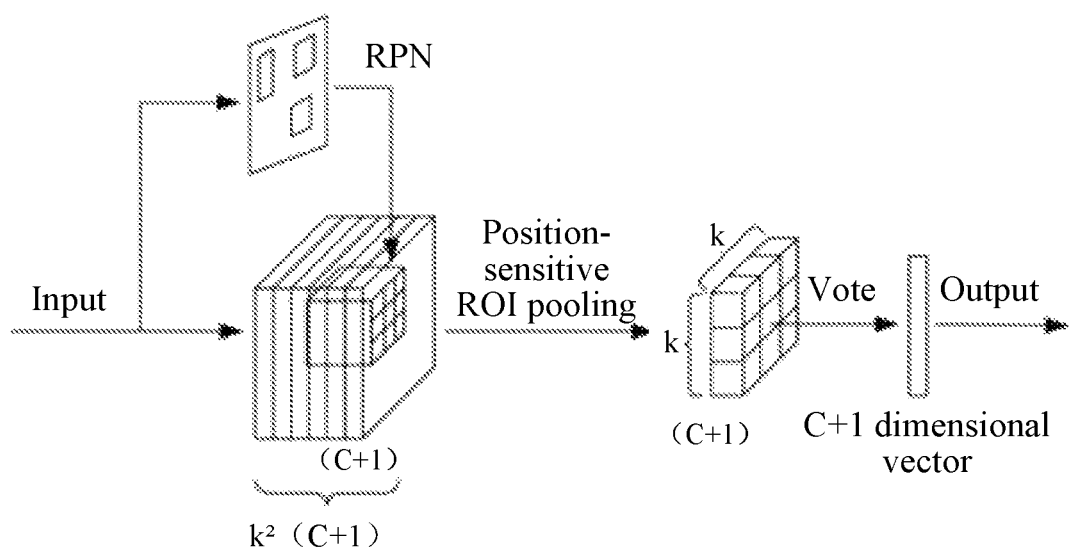
FIG. 2 is a schematic diagram of a region proposal network according to an embodiment of the present disclosure.

The present disclosure uses a k×k sliding window (3×3 in the RP-ResNet) to scan the entire feature map, as shown in FIG. 2, and then uses a convolution kernel with a size of 1×1 to perform a convolution operation to obtain a fraction map of a 2 k (class) channel and a fraction map of a 4 k (bounding box) channel. In the experiment, a small window predicts a position of a window containing a target to make region proposal more accurate.

A convolution response image is segmented into regions of interest (ROI) according to a result of the RPN. The regions of interest in some channels (in each channel of a relative spatial position of each class) are divided into k×k grids, each grid is averagely pooled, and then all channels are averagely pooled. For an ROI with a size of w×h, the size of each region is W/h×W/h, a last convolution layer generates $k^2$ fraction maps for each class, and a pooling response of an (i, j)th sub-region (0≤i, j≤k−1) of the ROI for a C class is shown in Equation 1:

$$r_C(i, j|\Theta) = \sum_{(x,y)} \frac{1}{n} z_{i,j,C}(x + x_0, y + y_o|\Theta) \quad (1)$$

where $r_c$(i, j|Θ) is a pooling response of an (i, j)th bin of the c class; $z_{i,j,c}$ is an output in $k^2$(C+1) fraction maps; ($x_0$, $y_0$) is a left top coordinate of the ROI; n is the total number of pixels in the bin; and Θ is a network parameter.

All the grabbing solutions in the ROI are stacked up, and then delivered to a full connection layer and to a residual network at the next stage.

Figure 3:
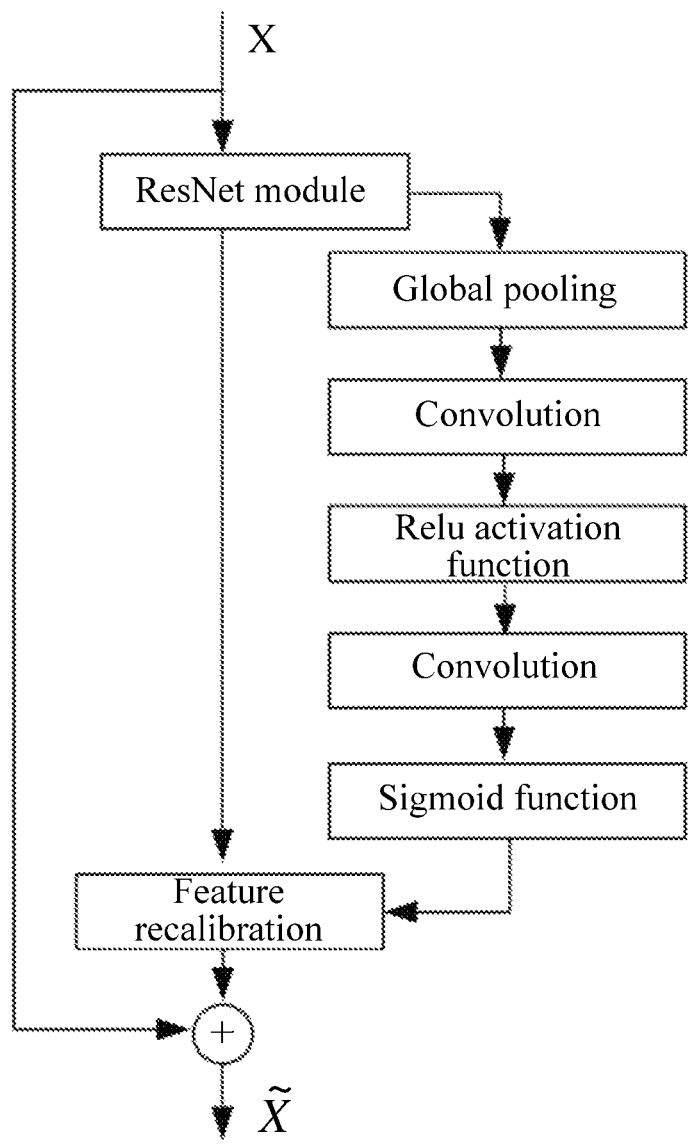
FIG. 3 is a schematic diagram of an SENet enhancement module according to an embodiment of the present disclosure.

The SENet is shown in FIG. 3, and the 40th layer of the ResNet is added to SENet, to perform squeeze, excitation, and feature recalibration to complete adaptive calibration of the feature channel. First, each feature map is compressed by global average pooling, and a C-class feature map is converted into a 1×1×C real number sequence, so that each real number has a global reception. Then two convolution layers are used to complete dimensionality reduction and dimensionality raising, where a first convolution layer reduces an original feature dimension to C/r of the original feature dimension and then increases the nonlinearity by a Relu activation function; and a second convolution layer restores the original feature dimension, then the normalized weight is obtained by a Sigmoid activation function. And finally an original feature channel is weighted by multiplication channel by channel to recalibrate the original feature. Squeeze, excitation, and feature recalibration are shown in equations 2-4.

$$z_c = F_{sq}(u_c) = \frac{1}{W \times H}\sum_{i=1}^{W}\sum_{j=1}^{H} u_c(i, j) \quad (2)$$

$$s = F_{ex}(z, W) = \sigma(W_2 \delta(W_1, z)) \quad (3)$$

$$\tilde{x}_c = F_{scale}(u_c, s_c) = s_c \cdot u_c \quad (4)$$

where $F_{sq}(u_c)$ represents compression of a feature map, W×H represents a size of a two-dimensional feature map, $F_{ex}$( ) represents feature extraction of the feature map, Z represents a compressed feature vector transformed from the input two-dimensional feature map, $W_1$ and $W_2$ are weights of the full connection layer, σ is a sigmoid activation function, and $\tilde{x}_c$ is a final output and is used as an input of a next stage.

Finally, the RP-ResNet outputs information of the grabbing points of the target.

The present disclosure uses the characteristic that a deep neural network has characteristics of weak semantic information and clear target positions in lower layers, and strong semantic information and fuzzy target positions in higher layers; the 30th layer of the ResNet is input into a regional proposal network (RPN), a network model is shown in FIG. 2, a k×k sliding window (3×3 in the RP-ResNet) is used to scan the entire feature map, and then a convolution kernel with a size of 1×1 is used to perform a convolution operation to obtain a fraction map of a 2 k (class) channel and a fraction map of a 4 k (bounding box) channel. In the experiment, a small window predicts the position of a window containing a target to make region proposal more accurate.

Furthermore, by a channel attention SENet structure, feature channel adaptive calibration is completed by means of squeeze, excitation, and feature recalibration, interdependence between feature channels is established, features positive to a grabbing detection task are enhanced, and less useful features are suppressed, thereby improving the detection accuracy.

To enable those skilled in the art to understand the technical solutions of the present disclosure more clearly, the detection method of the present disclosure will be described in more detail:

The grabbing detection method based on the RP-ResNet includes the following steps 1-7:

Step 1: A image of a target is acquired.

Step 2: A size of pixels of the acquired image of the target is adjusted to 277*277, the adjusted image of the target is input into a PR-ResNet-50, and image processing is performed in sequence from the 1st to 30th layers of the PR-ResNet-50.

Step 3: The feature map output from the 30th layer of the PR-ResNet-50 is input into a region proposal network to obtain an image processed by the region proposal network.

Step 3 specifically includes:
scanning the entire feature map using a k×k sliding window, and
performing a convolution operation on the entire feature map by using a convolution kernel with a size of 1×1 to obtain a fraction map of a 2 k class channel and a fraction map of a 4 k bounding box channel.

Step 4: ROI pooling is performed on the feature map output from the 30th layer of the PR-ResNet-50 and the image processed by the region proposal network.

Step 4 is specifically implemented as follows:
a convolution response image is segmented into regions of interest (ROI) according to the image processed by the RPN; the regions of interest in some channels are divided into k×k grids, each grid is averagely pooled, and then all channels are averagely pooled; for an ROI with a size of w×h, the size of each region is W/h×W/h, the last convolution layer generates $k^2$ fraction maps for each class, and the pooling response of the (i, j)th sub-region (0≤i, j≤k−1) of the ROI for the C class is shown in Equation 1:

$$r_C(i, j|\Theta) = \sum_{(x,y)} \frac{1}{n} z_{i,j,C}(x + x_0, y + y_o|\Theta)$$

where $r_c$(i, j|Θ) is a pooling response of the (i, j)th bin of the c class; $z_{i,j,c}$ is the output in $k^2$(C+1) fraction maps; ($x_0$, $y_0$) is the left top coordinate of the ROI; n is the total number of pixels in the bin; and Θ is a network parameter.

Step 5: An image after the ROI pooling is input into the PR-ResNet-50, and image processing is sequentially performed from the 31st to 40th layers of the PR-ResNet-50.

Step 6: A feature map X output from the 40th layer of the PR-ResNet-50 is input into the ResNet module for squeeze, excitation and feature recalibration to obtain a feature map output by the ResNet module.

Step 6 specifically includes:
compressing each feature map by global average pooling, and converting a C-class feature map into a 1×1×C real number sequence, such that each real number has a global reception;
performing dimensionality reduction and dimensionality raising on the feature map compressed by two convolution layers; where the first convolution layer reduces the original feature dimension to C/r of the original feature dimension and then increases the nonlinearity by a Relu activation function; and the second convolution layer restores the original feature dimension, and obtains the normalized weight by a Sigmoid activation function; and r represents a multiple of the dimensionality reduction;
weighting the feature map obtained after the dimensionality reduction and dimensionality raising to the original feature channel by multiplication channel by channel to recalibrate the original feature map,
where the equations for squeeze, excitation and feature recalibration are:

$$z_c = F_{sq}(u_c) = \frac{1}{W \times H} \sum_{i=1}^{W} \sum_{j=1}^{H} u_c(i, j)$$

$$s = F_{ex}(z, W) = \sigma(W_2 \delta(W_1, z))$$

$$\tilde{x}_c = F_{scale}(u_c, s_c) = s_c \cdot u_c$$

where $F_{sq}(u_c)$ represents compression of a feature map, W×H represents a size of a two-dimensional feature map, $F_{ex}(\ )$ represents feature extraction of the feature map, Z represents a compressed feature vector transformed from the input two-dimensional feature map, $W_1$ and $W_2$ are weights of the full connection layer, σ is the sigmoid activation function, $\tilde{x}_c$ is the final output, and is used as an input for the next stage; δ is the relu activation function, $u_c$ is an input feature map of the C dimension; $s_c$ is a feature map obtained after the squeeze and excitation; and $F_{scale}$ is a weight normalized by recalibration operation.

Step 7: The feature map output from the 40th layer of the PR-ResNet-50 and the feature map output by the ResNet module are input into the PR-ResNet-50, and image processing is performed from the 41st to 50th layers of the PR-ResNet-50 to obtain an image containing grabbing points of the target.

Specific embodiments are used to expound the principle and implementations of the present disclosure. The description of these embodiments is merely used to assist in understanding the method of the present disclosure and its core conception. In addition, those of ordinary skill in the art can make modifications in terms of specific implementations and scope of application based on the conception of the present disclosure. In conclusion, the content of this specification should not be construed as a limitation to the present disclosure.

What is claimed is:

1. A grabbing detection device based on a region proposal-residual network (RP-ResNet), comprising: a processor the RP-ResNet which is configured to connect with the processor and comprises:
an ResNet-50;
a region proposal network (RPN); and
an attention squeeze-and-excitation network (SENet) module;
wherein a 30th layer of the ResNet-50 is directly connected to a 31th layer of the PR-ResNet-50, and is also connected to the 31th layer of the ResNet-50 via the RPN, a 40th layer of the ResNet-50 is directly connected to a 41th layer of the ResNet-50, and is also connected to the 41th layer of the PR-ResNet-50 via the attention SENet module.

2. The grabbing detection device according to claim 1, wherein the RPN is configured to receive a convolution feature map, and output a convolution response image which has been segmented into regions of interest (ROI), and the RPN is further configured to divide the regions of interest in a part of channels into k×k grids, each grid is averagely pooled, and then all channels are averagely pooled; for an ROI with a size of w×h, the size of each region is W/h×W/h, a last convolution layer generates $k^2$ fraction maps for each class, and for an (i, j)th sub-region ($0 \le i, j \le k-1$) of the ROI:

$$r_C(i, j|\Theta) = \sum_{(x,y)} \frac{1}{n} z_{i,j,C}(x + x_0, y + y_0|\Theta) \quad (1)$$

wherein $r_c(i, j|\Theta)$ is a pooling response of an (i, j)th bin of a c class; $z_{i,j,c}$ is an output in $k^2(C+1)$ fraction maps; $(x_0, y_0)$ is a left top coordinate of the ROI; n is a total number of pixels in the bin; and $\Theta$ is a network parameter; and the attention SENet module is configured to enhance attention of a key channel in the grabbing detection task to improve the detection accuracy:

$$z_c = F_{sq}(u_c) = \frac{1}{W \times H} \sum_{i=1}^{W} \sum_{j=1}^{H} u_c(i, j) \quad (2)$$

$$s = F_{ex}(z, W) = \sigma(W_2 \delta(W_1, z)) \quad (3)$$

$$\tilde{x}_c = F_{scale}(u_c, s_c) = s_c \cdot u_c \quad (4)$$

wherein $F_{sq}(u_c)$ represents compression of a feature map, W×H represents a size of a two-dimensional feature map, $F_{ex}()$ represents feature extraction of the feature map, Z represents a compressed feature vector transformed from the input two-dimensional feature map, $W_1$ and $W_2$ are weights of a full connection layer, σ is a sigmoid activation function, and $\tilde{x}_c$ is a final output and is used as an input of a next stage.

3. A grabbing detection method based on the RP-ResNet comprising: providing a grabbing detection device comprising: a processor; and the RP-ResNet which is configured to connect with the processor and comprises: an ResNet-50; a region proposal network (RPN); and an attention squeeze-and-excitation network (SENet) module; wherein a 30th layer of the ResNet-50 is directly connected to a 31th layer of the PR-ResNet-50, and is also connected to the 31th layer of the ResNet-50 via the RPN, a 40th layer of the ResNet-50 is directly connected to a 41th layer of the ResNet-50, and is also connected to the 41th layer of the PR-ResNet-50 via the attention SENet module; step 1: acquiring an acquired image of a target; step 2: adjusting, by the processor, a size of pixels of the acquired image of the target to 277*277, and inputting the adjusted image of the target into the PR-ResNet, and performing image processing in sequence from a 1st layer to a 30th layer of the ResNet-50;

step 3: inputting a feature map output from the 30th layer of the ResNet-50 into the region proposal network to obtain an image processed by the region proposal network;

step 4: performing ROI pooling on the feature map output from the 30th layer of the ResNet-50 and the image processed by the region proposal network;

step 5: inputting an image obtained by the ROI pooling into the ResNet-50, and sequentially performing image processing from a 31st layer to a 40th layer of the PR-ResNet-50;

step 6: inputting a feature map output from the 40th layer of the PR-ResNet-50 into a SENet module for squeeze, excitation and feature recalibration to obtain a feature map output by the SENet module; and step 7: inputting the feature map output from the 40th layer of the ResNet-50 and the feature map output by the SENet module into the ResNet-50, and performing image processing from a 41st layer to a 50th layer of the ResNet-50 to obtain an image containing grabbing points of the target.

4. The grabbing detection method based on the RP-ResNet according to claim 3, wherein inputting the feature map output from the 30th layer of the PR-ResNet-50 into the region proposal network to obtain the image processed by the region proposal network, comprises:

scanning the entire feature map using a k×k sliding window; and using a convolution kernel with a size of 1×1 to perform a convolution operation on the entire feature map to obtain a fraction map of a 2 k-class channel and a fraction map of a 4 k-bounding-box channel.

5. The grabbing detection method based on the RP-ResNet according to claim 3, wherein performing ROI pooling on the feature map output from the 30th layer of the PR-ResNet-50 and the image processed by the region proposal network comprises:

segmenting a convolution response image into regions of interest (ROI) according to the image processed by the RPN, dividing the regions of interest in a part of channels into k×k grids, averagely pooling each grid, and then averagely pooling all channels; wherein for an ROI with a size of w×h, the size of each region is W/h×W/h, a last convolution layer generates $k^2$ fraction maps for each class, and the pooling response of an (i, j)th sub-region ($0 \le i, j \le k-1$) of the ROI for a C class is shown in Equation 1:

$$r_C(i, j|\Theta) = \sum_{(x,y)} \frac{1}{n} z_{i,j,C}(x + x_0, y + y_0|\Theta)$$

wherein $r_c(i, j|\Theta)$ is a pooling response of an $(i, j)$th bin of the C class; $z_{i,j,c}$ is an output in $k^2(C+1)$ fraction maps; $(x_0, y_0)$ is a left top coordinate of the ROI; n is a total number of pixels in the bin; and $\Theta$ is a network parameter.

6. The grabbing detection method based on the RP-ResNet according to claim 3, wherein inputting the feature map output from the 40th layer of the ResNet-50 into the SENet module for the squeeze, excitation and feature recalibration to obtain the feature map output by the SENet module comprises:
   compressing each feature map by global average pooling, and converting a C-class feature map into a 1×1×C real number sequence, such that each real number has a global reception;
   performing dimensionality reduction and dimensionality raising on the feature map compressed by two convolution layers, wherein a first convolution layer reduces an original feature dimension to C/r of the original feature dimension and then increases nonlinearity by a Relu activation function; r represents a multiple of the dimensionality reduction; and a second convolution layer restores the original feature dimension, and a normalized weight is obtained by a Sigmoid activation function; and
   weighting the feature map obtained by the dimensionality reduction and dimensionality raising to an original feature channel by multiplication channel by channel to recalibrate an original feature map.

7. The grabbing detection method based on the RP-ResNet according to claim 6, wherein equations for the squeeze, excitation and feature recalibration are:

$$z_c = F_{sq}(u_c) = \frac{1}{W \times H} \sum_{i=1}^{W} \sum_{j=1}^{H} u_c(i, j)$$

$$s = F_{ex}(z, W) = \sigma(W_2 \delta(W_1, z))$$

$$\tilde{x}_c = F_{scale}(u_c, s_c) = s_c \cdot u_c$$

wherein $F_{sq}(u_c)$ represents compression of a feature map, W×H represents a size of a two-dimensional feature map, $F_{ex}(\ )$ represents feature extraction of the feature map, Z represents a compressed feature vector transformed from the input two-dimensional feature map, $W_1$ and $W_2$ are weights of a full connection layer, $\sigma$ is the Sigmoid activation function, $\tilde{x}_c$ is a final output, and is used as an input for a next stage; $\delta$ is the Relu activation function, $u_c$ is an input feature map of a C dimension; $s_c$ is the feature map after the squeeze and excitation; and $F_{scale}$ is a weight normalized by recalibration operation.

8. The grabbing detection method based on the RP-ResNet according to claim 3, wherein the processor performs following steps:
   planning a grabbing path of a robot based on the image containing grabbing points of the target, and
   controlling the robot to move along the planned grabbing path and grabbing the target.

\* \* \* \* \*